United States Patent
Fan et al.

(10) Patent No.: US 10,007,502 B2
(45) Date of Patent: **\*Jun. 26, 2018**

(54) METHOD FOR UPGRADING COMMUNICATION DEVICE

(71) Applicant: Huawei Technologies Co., Ltd., Shenzhen (CN)

(72) Inventors: Jinfei Fan, Shenzhen (CN); Jiangfa She, Shenzhen (CN); Bing Luo, Shenzhen (CN); Weichuan Ye, Sao Paulo (BR)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days. days.

This patent is subject to a terminal disclaimer.

(21) Appl. No.: 13/864,965

(22) Filed: Apr. 17, 2013

(65) Prior Publication Data

US 2013/0239103 A1 Sep. 12, 2013

Related U.S. Application Data

(63) Continuation of application No. 10/586,952, filed as application No. PCT/CN2005/000159 on Feb. 4, 2005, now Pat. No. 8,495,616.

(30) Foreign Application Priority Data

Feb. 4, 2004 (CN) .......................... 2004 1 0005144

(51) Int. Cl.
*G06F 8/65* (2018.01)
*G06F 11/14* (2006.01)
(Continued)

(52) U.S. Cl.
CPC ............ *G06F 8/65* (2013.01); *G06F 11/1433* (2013.01); *H04L 41/082* (2013.01); *H04L 41/0856* (2013.01); *H04L 69/40* (2013.01)

(58) Field of Classification Search
None
See application file for complete search history.

(56) References Cited

U.S. PATENT DOCUMENTS 6,023,620 A 2/2000 Hansson
6,119,212 A 9/2000 Gross et al.
(Continued)

FOREIGN PATENT DOCUMENTS

CN 1249112 A 3/2000
CN 1358050 A 7/2002
(Continued)

OTHER PUBLICATIONS

Bhattacharya et al. "Coordinating backup/recovery and data consistency between database and file systems." Proceedings of the 2002 ACM SIGMOD international conference on Management of data. ACM, 2002. Retrieved on [Mar. 4, 2018] Retrieved from the Internet:URL<https://dl.acm.org/citation.cfm?id=564749>.*
(Continued)

*Primary Examiner* — Thuy Dao
*Assistant Examiner* — Cheneca Smith
(74) *Attorney, Agent, or Firm* — Huawei Technologies Co., Ltd.

(57) ABSTRACT

A method is disclosed for updating communication equipment through a server in a communication system, wherein the server stores the updated files used for updating the communication equipment. In this method, configuration data in the communication equipment are backed up in the server at first, the updated files are downloaded to the communication equipment from the server, the updated files are loaded to the communication equipment to implement the communication equipment update, and the configuration data backed up in the server are recovered to the communication equipment. The present invention can guarantee the
(Continued)

successful update of the communication equipment and no data loss after the update, thus the security of the communication equipment update is greatly improved.

18 Claims, 1 Drawing Sheet

(51) Int. Cl.
*H04L 12/24* (2006.01)
*G06F 9/445* (2018.01)
*H04L 29/14* (2006.01)

(56) References Cited

U.S. PATENT DOCUMENTS

| | | | |
|---|---|---|---|
| 6,832,373 B2 | 12/2004 | O'Neill | |
| 6,836,657 B2* | 12/2004 | Ji | G06F 8/68 455/418 |
| 6,931,558 B1* | 8/2005 | Jeffe et al. | 713/340 |
| 6,996,818 B2* | 2/2006 | Jacobi | G06F 8/68 709/223 |
| 7,185,048 B2* | 2/2007 | Arakawa | H04L 63/18 707/999.202 |
| 7,221,912 B2 | 5/2007 | Nelson et al. | |
| 7,386,846 B2 | 6/2008 | Rajaram | |
| 7,467,267 B1* | 12/2008 | Mayock | 711/162 |
| 7,472,386 B2 | 12/2008 | Lo | |
| 7,836,337 B1* | 11/2010 | Wu | G06F 11/1469 714/15 |
| 2002/0004935 A1* | 1/2002 | Huotari | H04L 12/12 717/170 |
| 2002/0023258 A1 | 2/2002 | Elwahab et al. | |
| 2002/0072350 A1 | 6/2002 | Fukuzato | |
| 2002/0104080 A1* | 8/2002 | Woodard | G06F 9/44505 717/176 |
| 2002/0144069 A1* | 10/2002 | Arakawa | H04L 63/18 711/162 |
| 2003/0037323 A1 | 2/2003 | Bae | |
| 2003/0041133 A1 | 2/2003 | Hiroshige et al. | |
| 2003/0084337 A1* | 5/2003 | Simionescu | G06F 9/4416 713/190 |
| 2003/0163640 A1* | 8/2003 | Pruett | G06F 3/0607 711/114 |
| 2003/0204578 A1* | 10/2003 | Yip et al. | 709/222 |
| 2003/0204711 A1 | 10/2003 | Guess | |
| 2003/0225985 A1 | 12/2003 | Suzuki et al. | |
| 2003/0225986 A1 | 12/2003 | Teshima | |
| 2004/0015940 A1* | 1/2004 | Heisey et al. | 717/168 |
| 2004/0068721 A1 | 4/2004 | O'Neill et al. | |
| 2004/0093597 A1 | 5/2004 | Rao et al. | |
| 2004/0153761 A1* | 8/2004 | Lee | G06F 11/1451 714/15 |
| 2004/0226008 A1* | 11/2004 | Jacobi | G06F 8/68 717/168 |
| 2004/0261072 A1 | 12/2004 | Herle | |
| 2005/0132351 A1 | 6/2005 | Randall et al. | |
| 2005/0144616 A1 | 6/2005 | Hammond et al. | |
| 2005/0289533 A1 | 12/2005 | Wang et al. | |
| 2006/0031476 A1* | 2/2006 | Mathes | H04L 41/0886 709/224 |

FOREIGN PATENT DOCUMENTS

| | | |
|---|---|---|
| EP | 1267261 A2 | 12/2002 |
| EP | 1271311 A2 | 1/2003 |

OTHER PUBLICATIONS

Kaczmarski et al. "Beyond backup toward storage management." IBM Systems Journal 42.2 (2003): 322-337.Retrieved on [Mar. 4, 2108] Retrieved from the Internet:URL<http://ieeexplore.ieee.org/abstract/document/5386857/>.*

Office Action dated Sep. 27, 2010, 20 pages, U.S. Appl. No. 10/586,952, filed Jun. 5, 2007.

Chen, X., "An Automatically Upgrading Method Orienting to C/S Application System," Journal of Zhengzhou Institute of Light Industry, vol. 16, No. 3, Sep. 2001, pp. 15-19.

"Method of Backuping User Configurations of Huawei Routers," Financial Computer of Huanan, Jul. 10, 2003, p. 84.

Probst, J., et al., "Flexible Configuration and Concurrent Upgrade for the IBM eServer z900," IBM Journal of Research and Development, vol. 46, No. 4-5, Jul. 2002, pp. 551-558.

Srivastava, S., "Redundancy Management for Network Devices," The 9th Asia-Pacific Conference on Communications, vol. 3, Sep. 21-24, 2003, pp. 1157-1162.

Office Action dated Apr. 28, 2011, 28 pages, U.S. Appl. No. 10/586,952, filed Jun. 5, 2007.

Office Action dated Aug., 28, 2012, 16 pages, U.S. Appl. No. 10/586,952, filed Jun. 5, 2007.

Notice of Allowance dated Mar. 19, 12 2013, 12 pages, U.S. Appl. No. 10/586,952, filed Jun. 5, 2007.

Foreign Communication From A Counterpart Application, Chinese Application 200410005144.2, Chinese Office Action dated Apr. 6, 2007, 7 pages.

Foreign Communication From A Counterpart Application, PCT Application PCT/CN2005/000159, European Search Report dated Mar. 8, 2007, 3 pages.

Foreign Communication From A Counterpart Application, European Application No. 05706597.1, European Office Action dated Sep. 10, 2007, 5 pages.

Foreign Communication From A Counterpart Application, European Application No. 05706597.1, European Office Action dated May 20, 2009, 26 pages.

Foreign Communication From A Counterpart Application, European Application No. 05706597.1, Response to European Office Action dated Dec. 3, 2009, 13 pages.

Foreign Communication From A Counterpart Application, PCT Application PCT/CN2005/000159, International Search Report dated May 19, 2005, 4 pages.

Foreign Communication From A Counterpart Application, PCT Application PCT/CN2005/000159, Written Opinion dated May 19, 2005, 3 pages.

\* cited by examiner

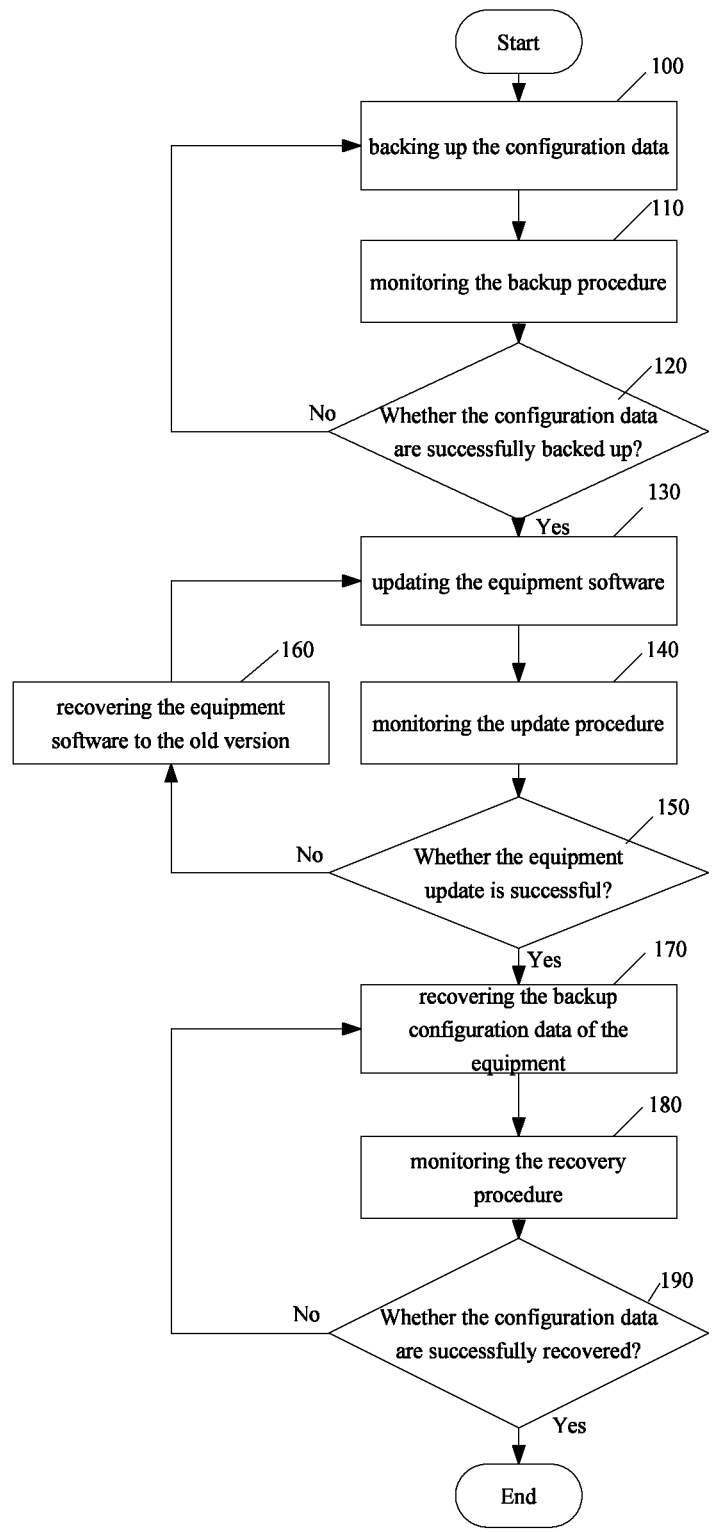

METHOD FOR UPGRADING COMMUNICATION DEVICE

CROSS-REFERENCE TO RELATED APPLICATIONS

This application is a continuation of U.S. patent application Ser. No. 10/586,952, filed on Jun. 5, 2007, which is a national stage application of International Application No. PCT/CN2005/000159, filed on Feb. 4, 2005, which claims priority to Chinese Patent Application No. 200410005144.2, filed on Feb. 4, 2004. The afore mentioned patent applications are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the communication field, more particularly to a method for updating communication equipment.

BACKGROUND

In the communication field, as new technologies and new services continuously emerge, the software of the communication equipment needs to be updated frequently, so as to maintain and optimize the communication network and provide more extensive and better communication services. Software updates involve almost all communication equipment, such as exchangers, routers, Integrated Access Devices (IADs) and so on.

In all the existing software update procedures, the software to be updated is stored in an independent server, and then a data transmission connection is established between this server and the communication equipment to be updated, so that the software stored in the server can be transmitted to the communication equipment. During the update procedure, the corresponding files of the software stored in the server are directly transmitted to the communication equipment, and then the communication equipment loads the software to replace the old files with the new files, and the equipment is updated accordingly.

However, in the existing methods for updating equipment, the communication equipment does not back up the old configuration data which includes the user data, therefore during the software update procedure, if the communication equipment is powered off or the updated file error happens and so on, the old configuration data may be lost, which can bring great loss to the operators. In other words, the risk of losing data during the equipment update procedure exists in the prior art, which affects the security of the equipment update.

In addition, in the existing methods for updating equipment, the software update procedure is not monitored. If an error occurs during the update procedure (e.g., if the communication equipment is powered off or an updated file error happens), the old service ability of equipment may not be inherited after the update procedure is finished, which may lead to an unsuccessful equipment update and harm the security of the equipment update.

Moreover, in the existing communication equipment, the old software version is usually not saved during the update procedure, so the old software version is not available to the equipment anymore in the case of an unsuccessful update. Therefore, after the unsuccessful update, the communication equipment may change into failure or fault and cannot function normally, which greatly affects the security of the equipment update.

SUMMARY

In view of the above, the present invention is to provide a method for updating equipment that can implement a secure update, so as to avoid data loss from happening during the update procedure and make sure that the update is successful.

The present invention discloses a system comprising a network equipment configured to communicate with one or more servers and a manager system that externally connects to the network equipment. The network equipment further comprises a processor configured to: receive a backup configuration data command from the management system; in response to the backup configuration data command, back up first configuration data in a first software environment to a specified server of the one or more servers; receive a first command issued by the management system, the first command comprising server address information of a server and file information associated with a software file; download an update to the software file of software from the server according to the server address information of the server and the file information specified in the first command; load the update downloaded software file to the network equipment; in response to a second command issued by the management system, download second configuration data that are a backup of the first configuration data from a specified server where the second configuration data are stored and that is specified by service information in the second command; load the downloaded second configuration data to apply the downloaded second configuration data to a second software environment loaded with the downloaded software file.

The present invention discloses a method in a network equipment, comprising: receiving a backup configuration data command from a management system to the network equipment, wherein the management system remotely accesses the network equipment; in response to the backup configuration data command, backing up first configuration data in a first software environment from the network equipment to a specified server via a Trivial File Transfer Protocol (TFTP); receiving a first command from the management system to the network equipment, wherein the first command comprises server address information of a server and file information associated with a software file; downloading the software file from the server specified in the first command; loading the downloaded software file to the network equipment; in response to a second command issued by the management system, downloading second configuration data that are a backup of the first configuration data via the TFTP from a specified server where the second configuration data are stored and that is specified by service information in the second command; loading the downloaded second configuration data to apply the downloaded second configuration data to a second software environment loaded with the software file.

The present invention discloses a network equipment, which remotely accesses a management system and one or more servers, the network equipment comprising a processor configured to: receive a backup configuration data command from a management system to the network equipment; in response to the backup configuration data command, back up first configuration data in a first software environment from the network equipment to a specified server via a TFTP; receive a first command from the management system, wherein the first command comprises server address information of a server and file information associated with a software file; download the software file from the server specified in the first command; load the downloaded software file to the network equipment; in response to a second command issued by the management system, download second configuration data that are a backup of the first configuration data via the TFTP from a specified server where the second configuration data are stored and that is specified by service information in the second command; load the downloaded second configuration data to apply the downloaded second configuration data to a second software environment loaded with the downloaded software file.

It can be seen from the above-mentioned technical schemes that, besides the equipment update by directly downloading the updated files and loading the updated files according to the prior art, the present invention further includes the process of backing up the configuration data before the update and recovering the configuration data after the update, so that data loss will not happen when the communication equipment power off happens or the update is unsuccessful and the old software version needs be maintained. So the present invention can avoid great loss for the operators due to the data loss and the security of the equipment update is improved accordingly.

During the procedures of backing up the configuration data, updating the software and recovering the configuration data, the communication equipment operation is monitored all the time to judge whether the operation is successful. If the operation is unsuccessful, the corresponding operation will be executed again automatically, so that the configuration data can be backed up, the software can be updated and the configuration data can be recovered again even if the communication equipment is powered off or the update is unsuccessful. Therefore, the present invention can guarantee the update is successful anyway and thus improve the security of the equipment update.

Moreover, in the present invention, the old software version can be stored before the update, so that the old software version is available once the update is unsuccessful. In the prior art, once the update is unsuccessful, new software cannot be run and the old software is not available, so the communication equipment changes into failure or fault, while the present invention can prevent such situation from happening and thus further improve the security of the equipment update.

BRIEF DESCRIPTION OF THE DRAWING

The FIGURE is a flowchart illustrating the equipment update method according to one embodiment of the present invention.

DETAILED DESCRIPTION

The present invention will be further described in detail hereinafter with reference to the accompanying drawing and specific embodiments.

The communication equipment can be the equipment utilized in any fixed or mobile communication networks, such as exchangers, routers, IADs and so on. Hereby the IAD can be the video telephone, the Media Gateway Control Protocol (MGCP) IAD, the Internet Protocol (IP) telephone terminal or others. The following embodiment will be illustrated taking the IAD for example, but those skilled in the art should understand that all the above illustrations can be applied in the other communication equipment without any obstacles.

In the prior art, the data can be easily lost and the software update is not guaranteed to be successful. In order to solve such problems, processes of backing up the configuration data, recovering the configuration data and monitoring the whole software update procedure are added to the present invention. The FIGURE is a flowchart illustrating the whole equipment update method after adding the above-mentioned processes.

As shown in the FIGURE, in step 100, the configuration data are backed up at first. Specifically, first the File Transfer Protocol (FTP)/TFTP server information is configured to the IAD through the Integrated Access Device Management System (IADMS), and then the IADMS sends a Simple Network Management Protocol (SNMP) backup configuration data command to the IAD. After receiving this command, the IAD transmits the configuration data to the specified FTP/TFTP server via the FTP/TFTP protocol.

The configuration data hereby can be one or more than one type among user data, port data, protocol parameter data and default parameter data for guaranteeing the normal operation of the equipment. Of course, those skilled in the art should understand that the configuration data can also be other types of data besides the above mentioned ones.

In step 110, the procedure of backing up the configuration data is monitored. While backing up the configuration data, the IAD will report the current backup progress to the IADMS through the progress trap, so that the IADMS can acquire the backup status of the IAD through the progress trap received from the IAD, thus the monitor function is implemented.

In step 120, the IADMS judges whether the configuration data are successfully backed up, if yes, executing the next step 130; otherwise, returning to the step 100, which is to instruct the IAD to back up the configuration data over again, and the IAD will back up the configuration data over again after receiving this instruction.

The process of judging whether the configuration data are successfully backed up is to judge whether a backup failure trap is received or whether the backup procedure exceeds the scheduled time. If the IADMS receives the backup failure trap from the IAD or detects that the operating time of the backup procedure of the IAD exceeds the scheduled time, the IADMS confirms the backup has failed; otherwise, the backup is successful.

Moreover, after confirming the backup has failed, IADMS can notify a user that the current backup fails and that the user can choose whether to back up the data over again. After receiving the user's indication of backing up the data over again, the IADMS will instruct the IAD to back up the configuration data over again. If the user chooses not to back up the data anymore, the current process will be ended.

In step 130, the equipment software is updated. First, the IADMS sends an SNMP update command to the IAD, and this command comprises an updated FTP/TFTP server address, updated file names and other information. After receiving this command, the IAD analyzes it and downloads the updated files from the FTP/TFTP server via the FTP/TFTP protocol, according to the FTP/TFTP server address, the updated file names and other information comprised in this command. After downloading all the updated files, the IAD loads the updated files to implement the equipment software update.

In addition, as to some communication equipment, the loaded software is not effective until resetting the equipment. In this case, the IADMS needs to send an SNMP reset command to the IAD and request the IAD to reset. The IAD resets itself after receiving this SNMP reset command, so that the current loaded new software version can be effective. Of course, as to those communication equipment that can make the loaded software effective without resetting themselves, the above-illustrated reset process can be removed.

In step 140, the update procedure of the equipment software is monitored. While downloading and loading the updated files, the IAD will report the current update progress to the IADMS through the progress trap, so that IADMS can acquire the update status of the IAD through the progress trap received from the IAD, thus the monitor function is implemented.

In step 150, IADMS judges whether the equipment update is successful. If it is unsuccessful, it goes to step 160, i.e., the IADMS will instruct the IAD to recover the old software version before the software update, and the IAD will automatically replace the current software with the old one after receiving this indication. If the IADMS judges that the update is successful, it will execute the next step 170.

In the present embodiment, after the step 160, which means after the IAD has replaced the current software version with the old one, the step 130 will be automatically executed, which means the IADMS will instruct the equipment to execute the update process over again. As the update may be unsuccessful finally due to power off in the previous update procedure, executing the update process over again can guarantee the update function after the power is recovered; while if the update is unsuccessful because of the updated files error, the IADMS can re-specify the correct updated file names in the SNMP update command sent to the IAD so as to make sure that the update is successful this time.

Of course, the IADMS can also notify the user of this situation after the IAD has recovered the old software version. The IADMS can also ask the user whether to update the equipment over again. After receiving the user's indication of updating equipment over again, the IADMS will instruct the IAD to execute the update operation over again. If the user chooses not to update anymore, the current process will be ended.

In the present invention, two memory buffers can be set inside the equipment to be updated, one for storing the software version before the update and the other for storing the new software version. In this way, if the current update is unsuccessful, the equipment can read the old software version from the memory buffer that stores the software version before the update so as to recover the old software. Since the two software versions are stored in two memory buffers respectively, the unsuccessful update will not affect the software version before the update, so that communication equipment can recover the complete old software and will not change into failure or fault because of the abnormal operation.

The procedure of judging whether the update is successful is to judge whether an update failure trap is received or whether the update operation exceeds the scheduled time. If the IADMS receives the update failure trap from the IAD or determines that the update operation of IAD exceeds the scheduled time, the update is deemed as unsuccessful, otherwise, the update is successful.

In step 170, the backup configuration data are recovered. The IADMS sends the recovery configuration data command to the IAD, and the command comprises the address information of the FTP/TFTP server which stores the configuration data, the configuration data file names and so on. After receiving this command, the IAD analyzes this command and downloads the configuration data from the corresponding FTP/TFTP server via the FTP/TFTP protocol according to the FTP/TFTP server address, the configuration data name and other information comprised in this command. After downloading all the configuration data files, the IAD loads the updated files.

In step 180, the recovery procedure of the configuration data is monitored. While downloading the configuration data and loading the configuration data, the IAD will report the current progress to the IADMS through the progress trap, so that the IADMS can acquire the recovery status of the IAD through the progress trap received from the IAD, thus the monitor function is implemented.

In step 190, the IADMS judges whether the configuration data are successfully recovered, if yes, the equipment update procedure is successfully completed and the current process is ended. If the configuration data are not successfully recovered, the step 170 is executed, namely the IADMS instructs the IAD to recover the configuration data over again. After receiving this instruction, the IAD downloads and loads the configuration data over again.

The process of judging whether the configuration data are successfully recovered is to judge whether a recovery failure trap is received or whether the recovery procedure exceeds the scheduled time. If the IADMS receives the recovery failure trap from the IAD or determines that the recovery operation of the IAD exceeds the scheduled time, the IADMS confirms that the recovery operation fails; otherwise, the recovery operation is successful.

Moreover, after confirming that the recovery operation fails, the IADMS can notify the user that current recovery operation fails and asks the user whether to recover the data over again. After receiving the user's instruction of recovering the data over again, the IADMS instructs the IAD to recover the configuration data over again. If the user chooses not to recover the data anymore, the current process will be ended.

In some cases, like when the new software and old software are different from each other, it is needed to modify the configuration data properly, so that the configuration data can be successfully applied in the new software environment after being recovered, i.e. the configuration data can be successfully recovered. Hereby after the IAD resets in the above-mentioned step 170, the IADMS further judges whether it is needed to modify the configuration data, if yes, the IADMS notifies the user to modify the data or instructs the IAD to automatically modify the data by running an application program which is specially used for modifying the configuration data, and continues to execute the recovery operation for the configuration data in the step 170 after finishing the modification. Hereby, the configuration data modification, like conversing configuration data's format, can make the new configuration data format accord with the requirement of the new software, so as to make sure the configuration data can be successfully applied in the new software environment.

In case of needing to modify the configuration data, the configuration data recovery may be unsuccessful finally because of the incorrect configuration data modification, when the IADMS finds the configuration data recovery unsuccessful, it will return to the process of instructing the user to modify the configuration data or instructing the IAD to run the application program to modify the configuration data. After the configuration data are correctly modified, the configuration data are recovered again so as to make sure the configuration data can be successfully recovered.

The above mentioned is just the preferred embodiment of the present invention and not used to confine the present invention. Any modification, equivalent substitute and improvement within the spirit of the present invention are within the protection scope of the present invention.

What is claimed is:

1. A method performed by a network device, comprising:
   receiving a first command for uploading configuration data to a first server;
   uploading the configuration data to the first server in response to the first command before a software installed in the network device is updated;
   receiving a second command for downloading a file for updating the software from a second server, wherein the network device, the first server, and the second server are different devices from each other and wherein the second command comprises server address information of the second server and file information associated to the file;
   downloading the file from the second server and updating the software with the file in response to the second command;
   receiving a third command for recovering the configuration data to the network device;
   downloading new configuration data that was converted from the configuration data from the first server; and
   recovering the configuration data to the network device by loading the new configuration after the software is updated.

2. The method according to claim 1, wherein the network device supports a Simple Network Management Protocol (SNMP).

3. The method according to claim 1, wherein the network device supports Trivial File Transfer Protocol (TFTP).

4. The method according to claim 1, wherein the network device is one of a switch, a router and an Integrated Access Device (IAD).

5. A management system, comprising:
   a management device having a hardware processor that sends a first command to a network device to request the network device to upload configuration data to a first server, sends a second command to the network device to request the network device to download from a second server a file for updating a software installed in the network device, and sends a third command to the network device to request the network device to recover the configuration data to the network device, wherein the network device, the first server, and the second server are different devices from each other,
   wherein the network device that uploads the configuration data in response to the first command to the first server before the software is updated, downloads the file from the second server and updates the software with the file in response to the second command,
   downloads new configuration data that was converted from the configuration data from the first server, and
   recovers the configuration data of the network device by loading the new configuration data after the software is updated.

6. The system according to claim 5, wherein
   the management device is further configured to monitor a progress of uploading the configuration data to the first server.

7. The system according to claim 5, wherein
   the management device is further configured to monitor a progress of downloading the file for update of the software.

8. The system according to claim 5, wherein the network device communicates with the management device via a Simple Network Management Protocol (SNMP).

9. The system according to claim 5, wherein the network device communicates with the first or second server via a Trivial File Transfer Protocol (TFTP).

10. The system according to claim 5, wherein the network device is one of a switch, a router and an Integrated Access Device (IAD).

11. A network device, comprising:
    a receiver that receives a first command for uploading configuration data to a first server, receives a second command for downloading a file for updating a software installed in the network device from a second server, and receivers a third command for recovering the configuration data to the network device, wherein the network device, the first server, and the second server are different devices from each other and wherein the second command comprising comprises server address information of the second server and file information associated to the file; and
    a hardware processor coupled to the receiver that uploads the configuration data to the first server before the software is updated, downloads the file from the second server and updates the software with the file, downloads a new configuration data that was converted from the configuration data from the first server, and recovers the configuration data to the network device by loading the new configuration data after the software is updated.

12. The network device according to claim 11, wherein the network device supports a Simple Network Management Protocol (SNMP).

13. The network device according to claim 11, wherein the network device supports a Trivial File Transfer Protocol (TFTP).

14. The network device according to claim 11, wherein the network device is one of a switch, a router, and an Integrated Access Device (IAD).

15. A network device, comprising:
    a memory storage comprising instructions; and
    one or more processors coupled to the memory that execute the instructions to:
    receive a first command for uploading configuration data to a first server;
    upload the configuration data to the first server in response to the first command before a software installed in the network device is updated;
    receive a second command for downloading a file for updating the software from a second server, wherein the network device, the first server, and the second server are different devices from each other and wherein the second command comprising comprises server address information of the second server and file information associated to the file;
    download the file from the second server and update the software with the file in response to the second command;

receive a third command for recovering the configuration data to the network device;
download new configuration data that was converted from the configuration data from the first server; and
recover the configuration data to the network device by loading the new configuration data after the software is updated.

16. The network device according to claim 15, wherein the network device supports a Simple Network Management Protocol (SNMP).

17. The network device according to claim 15, wherein the network device supports a Trivial File Transfer Protocol (TFTP).

18. The network device according to claim 15, wherein the network device is one of a switch, a router and an Integrated Access Device (IAD).

* * * * *